United States Patent
Chen et al.

(10) Patent No.: US 7,484,865 B2
(45) Date of Patent: Feb. 3, 2009

(54) LIGHT GUIDING APPARATUS WITH SHIELDING MEMBER OF A COMPUTER

(75) Inventors: Yun-Lung Chen, Shenzhen (CN); Yu-Ming Xiao, Shenzhen (CN); Xian-Huang Gao, Shenzhen (CN); Jian Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,948

(22) Filed: May 29, 2006

(65) Prior Publication Data

US 2007/0159830 A1 Jul. 12, 2007

(30) Foreign Application Priority Data

Jan. 9, 2006 (CN) .................. 2006 2 0053780

(51) Int. Cl.
*F21V 7/00* (2006.01)

(52) U.S. Cl. .............. 362/303; 362/298; 362/367; 362/368

(58) Field of Classification Search ......... 362/277–284, 362/301, 303, 321, 512, 516, 367, 362, 279, 362/322, 248, 351, 269, 271; 312/223.1–223.3; 361/724–727
See application file for complete search history.

(56) References Cited

U.S. PATENT DOCUMENTS

| | | | | |
|---|---|---|---|---|
| 1,520,869 A | * | 12/1924 | Brown | 362/325 |
| 1,591,754 A | * | 7/1926 | Gates | 362/283 |
| 4,389,817 A | * | 6/1983 | Olberding | 49/163 |
| 5,339,226 A | * | 8/1994 | Ishikawa | 362/539 |
| 5,373,424 A | * | 12/1994 | Ishikawa | 362/538 |
| 6,059,433 A | * | 5/2000 | Otaka et al. | 362/507 |
| 6,186,651 B1 | * | 2/2001 | Sayers et al. | 362/512 |
| 6,607,294 B2 | * | 8/2003 | Taniuchi | 362/514 |
| 2002/0064045 A1 | * | 5/2002 | Sugimoto et al. | 362/272 |
| 2005/0240951 A1 | * | 10/2005 | Chen et al. | 720/655 |

FOREIGN PATENT DOCUMENTS

JP 06076604 A * 3/1994

* cited by examiner

*Primary Examiner*—John A Ward
(74) *Attorney, Agent, or Firm*—Wei Te Chung

(57) ABSTRACT

A light guiding apparatus for a computer bezel includes a panel (14), a guiding member (30), and a shielding member (50). The panel has a light-pervious member (144). The guiding member is attached to the panel for guiding light therein. The guiding member has a light-reflecting cavity with a mouth (37) coupled to the light-pervious member. The shielding member is situated between the panel and the light-pervious member. The shielding member includes a shielding board (56) for covering the mouth, and an axle (54) traverses the shielding board. The shielding member is pivotable with respect to the guiding member between a closed position where the shielding member is horizontal to cover the mouth and an open position where the shielding member is vertical to reveal the mouth.

18 Claims, 5 Drawing Sheets

LIGHT GUIDING APPARATUS WITH SHIELDING MEMBER OF A COMPUTER

FIELD OF THE INVENTION

The present invention relates to a light guiding apparatus, and more particularly to a guiding apparatus with shielding member of a computer.

DESCRIPTION OF RELATED ART

A computer usually has a light in a power button of a front bezel to show working status of the computer. The light is usually a light-emitting diode (LED), and connects to a power supply in the computer.

A computer with a light-reflecting member is disclosed. A panel assembly of the computer includes a front panel, and the light-reflecting member attached to the front panel. A light-pervious member is disposed on the front panel. The light-reflecting member has a hollow body. A light source is accommodated in the hollow body. A through opening is defined in the hollow body for coupling with the light-pervious member of the front panel. Some rays of the light source are reflected by the light-reflecting member, and shine on the light-pervious member through the through opening. However, sometimes a user desires to cover the light-pervious member.

What is needed, therefore, is a light guiding apparatus with a movable shielding member for hiding the light.

SUMMARY OF THE INVENTION

A light guiding apparatus for a computer bezel includes a panel, a guiding member, and a shielding member. The panel has a light-pervious member. The guiding member is attached to the panel for guiding light therein. The guiding member has a light-reflecting cavity with a mouth coupled to the light-pervious member. The shielding member is situated between the panel and the light-pervious member. The shielding member includes a shielding board for covering the mouth, and an axle traverses the shielding board. The shielding member is pivotable with respect to the guiding member between a closed position where the shielding member is horizontal to cover the mouth and an open position where the shielding member is vertical leaving the mouth uncovered.

Other advantages and novel features will be drawn from the following detailed description of a preferred embodiment with attached drawings, in which:

DETAILED DESCRIPTION OF THE INVENTION

Figure 1:
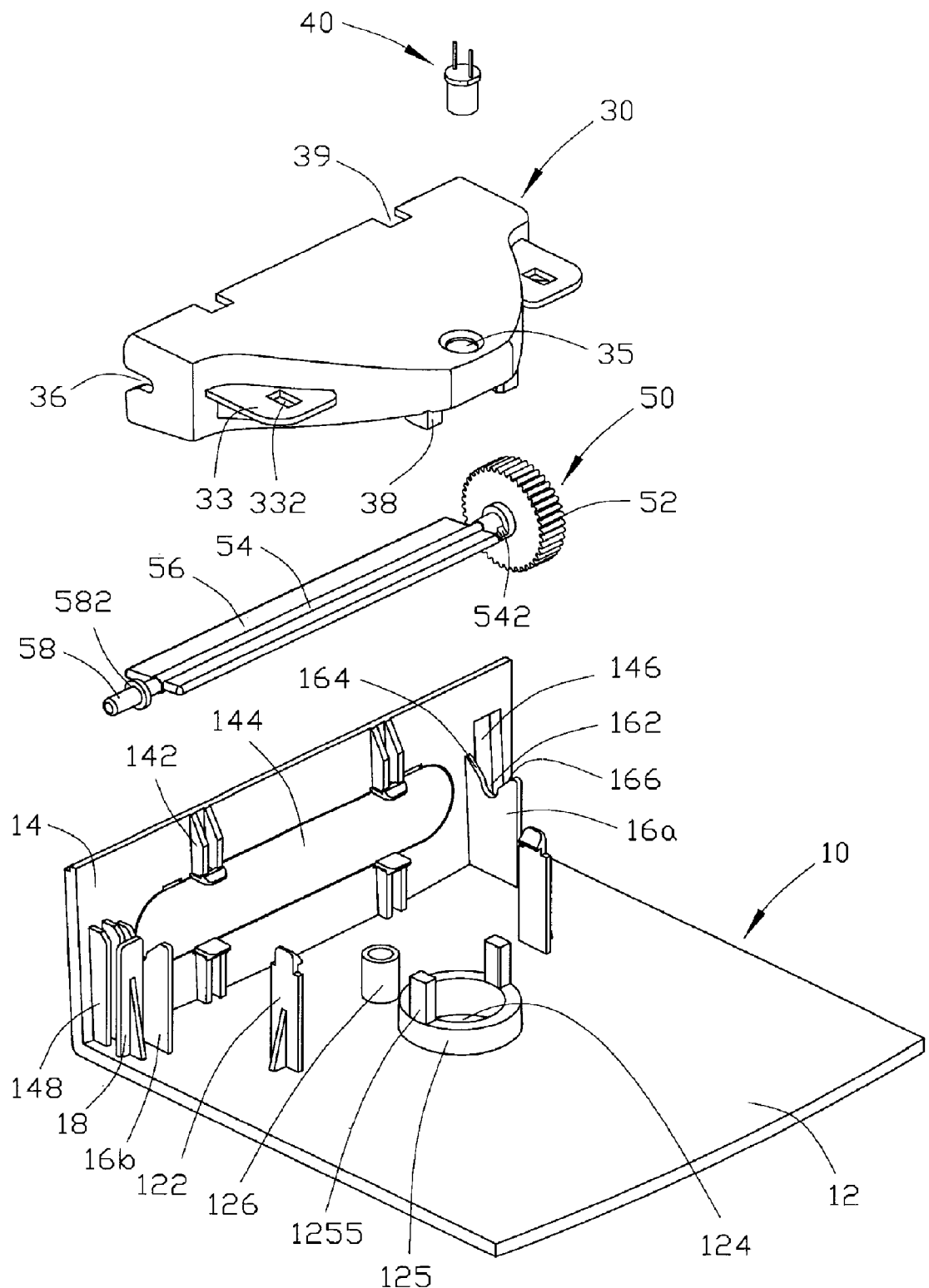
FIG. 1 is an exploded, isometric view of a light guiding apparatus with a shielding member of a preferred embodiment of the present invention, the light guiding apparatus including a bezel, a guiding member, a shielding member, and an LED.

Referring to FIG. 1, a light guiding apparatus for guiding and shielding the light emitting from a light emitting diode (LED) 40 includes a bezel 10, a guiding member 30, and a shielding member 50. The LED 40 connects to a power supply of a computer system.

The bezel 10 includes a bottom panel 12 and a side panel 14 perpendicularly formed from an edge of the bottom panel 12. The bottom panel 12 has a button opening 124 in a middle portion. A power button 125 is secured within the button opening 124. A pair of extending tabs 1255 is formed on the power button 125. A sheath 126 is formed on the bottom panel 12 adjacent to the button opening 124. A pair of resilient barbs 122 is respectively formed on the bottom panel 12 at two opposite sides of the sheath 126. A pair of supporting posts 16a and 16b is respectively formed in the corners of the bottom panel 12 adjacent to the side panel 14. Each supporting post 16a, 16b has a V-shaped cutout in a top edge, forming a notch 162 and two slanting portions 164 and 166 at two sides thereof. A resilient tongue 18 is formed on the bottom panel 12 facing the side panel 14 next to the supporting post 16b. Two spaced locating beams 148 are perpendicularly formed on the side panel 14 near an edge corresponding to the resilient tongue 18 of the bottom panel 12, so that a slit is defined therebetween. A through slot 146 is defined in the side panel 14 between the supporting post 16a and a nearest edge of the side panel 14. An opening is defined in the side panel 14 between the two supporting posts 16a and 16b. A translucent member 144 is made in size approximately equal to the opening and secured therein. Two guiding portions 142 are formed on the side panel 14 perpendicular to the bottom panel 12 between the supporting posts 16a, 16b.

Figure 2:
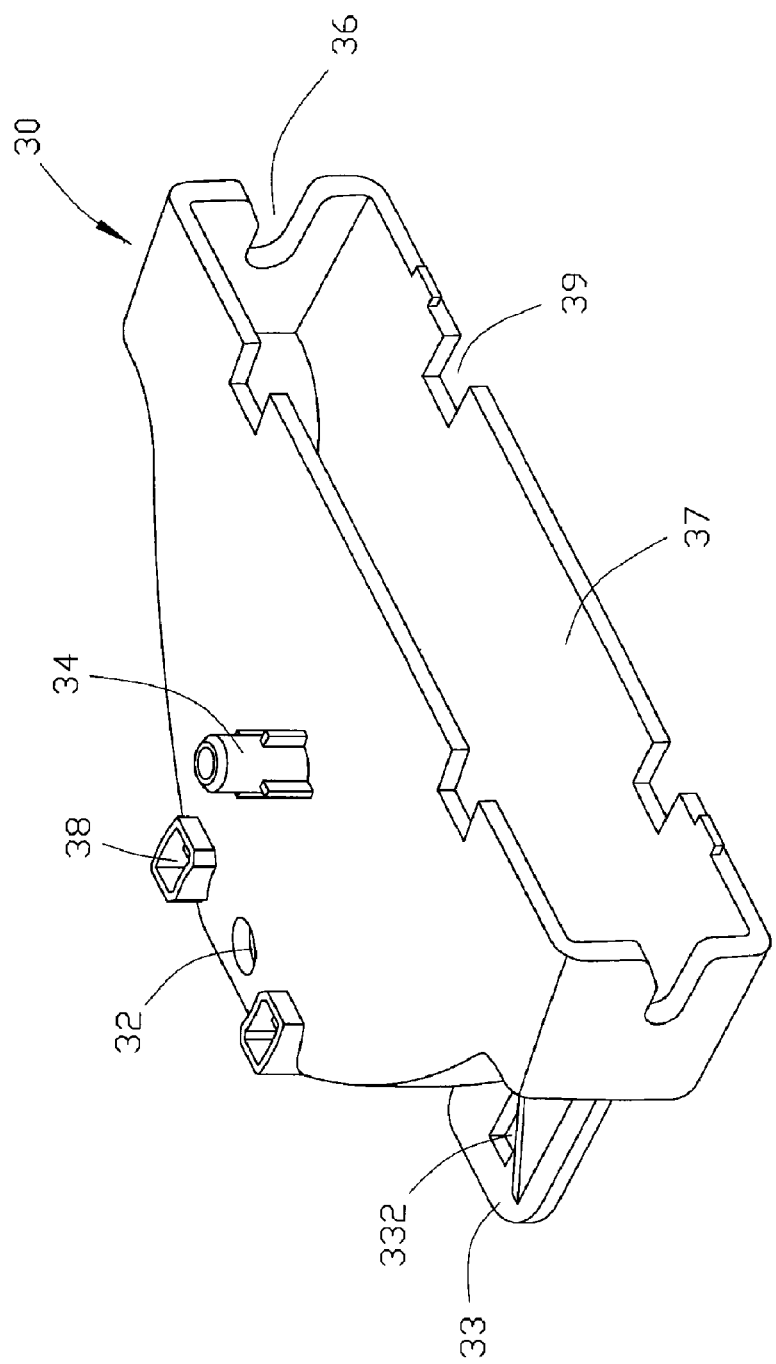
FIG. 2 is an enlarged, isometric, inverted view of the guiding member of FIG. 1.

Referring also to FIG. 2, the guiding member 30 is made in a substantially semi-discoid shape and has a hollow configuration. An inner surface of the guiding member 30 is covered by light-reflecting material. A rectangular mouth 37 is defined in a side of the guiding member 30. A pair of pivoting slots 36 is respectively defined at opposite sides of the mouth 37. Two pairs of cutouts 39 are respectively defined at a top and bottom of the mouth 37 corresponding to the guiding portions 142 of the bezel 10. The guiding member 30 has a pair of ear shaped portions 33 at opposite sides thereof. Each portion 33 has a securing opening 332 therein for receiving a corresponding resilient barb 122. A through hole 35 is defined in a top cover of the guiding member 30 for accommodating the LED 40. A post 34 protrudes from a bottom cover of the guiding member 30 corresponding to the sheath 126 of the bezel 10. A pair of hollow receiving portions 38 is formed on the bottom cover of the guiding member 30 corresponding to the tabs 1255 of the bezel 10. A light-pervious opening 32 is defined between the two receiving portions 38 in the guiding member 30.

The shielding member 50 includes a rectangular shielding board 56, an axle 54 traverses the shielding board 56. A knob 52 (operating portion) is formed at one end of the shielding board 56. A blocking tab 542 is formed on the axle 54 between the shielding board 56 and the knob 52. A holding end 58 is formed at the other end of the axle 54. A blocking tab 584 (referring to FIG. 3) and a flange 582 are formed at the holding end 58.

Figure 3:
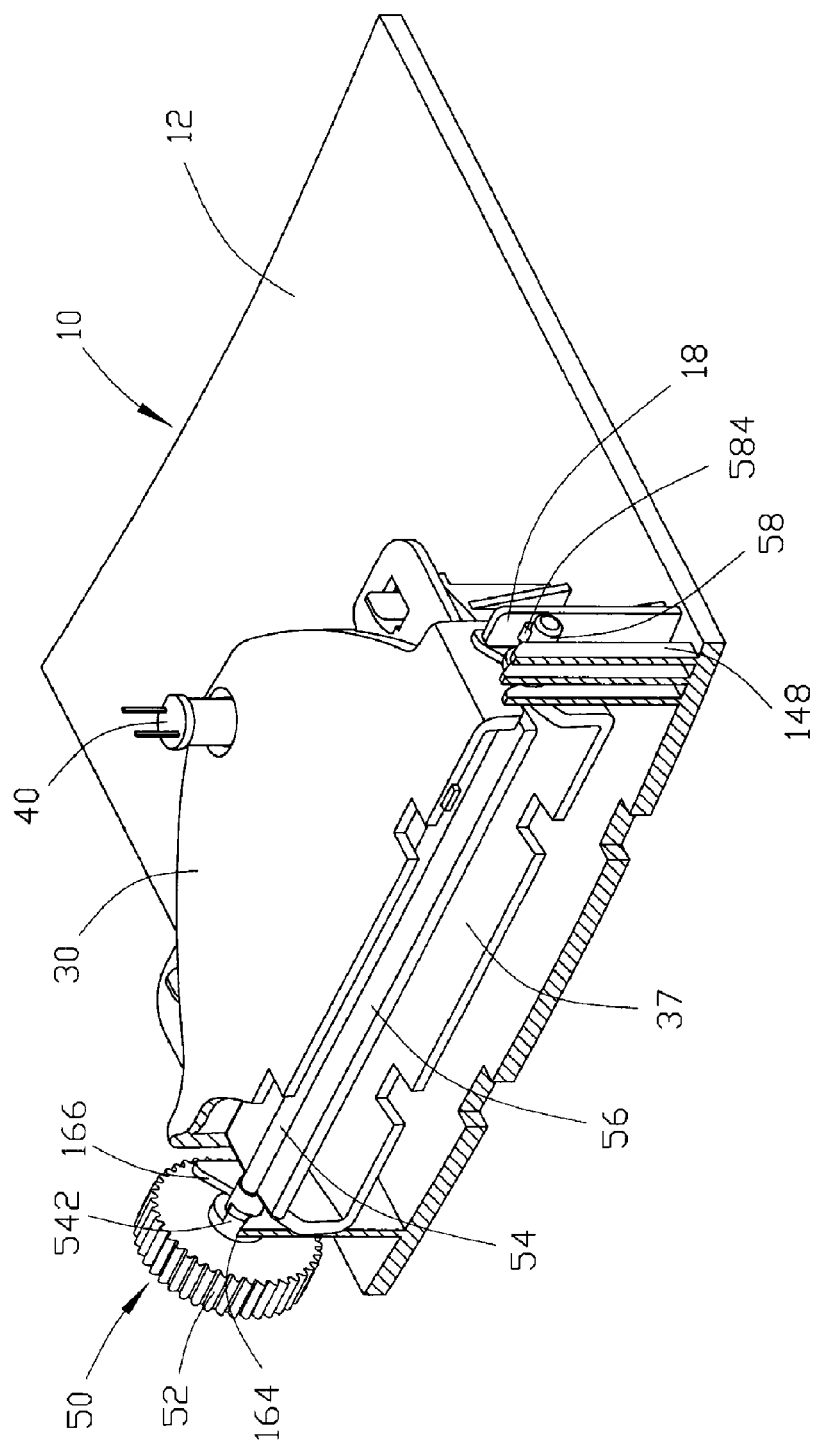
FIG. 3 is an assembled, isometric view of the light guiding apparatus of FIG. 1, but part of the bezel is cutaway.
Figure 4:
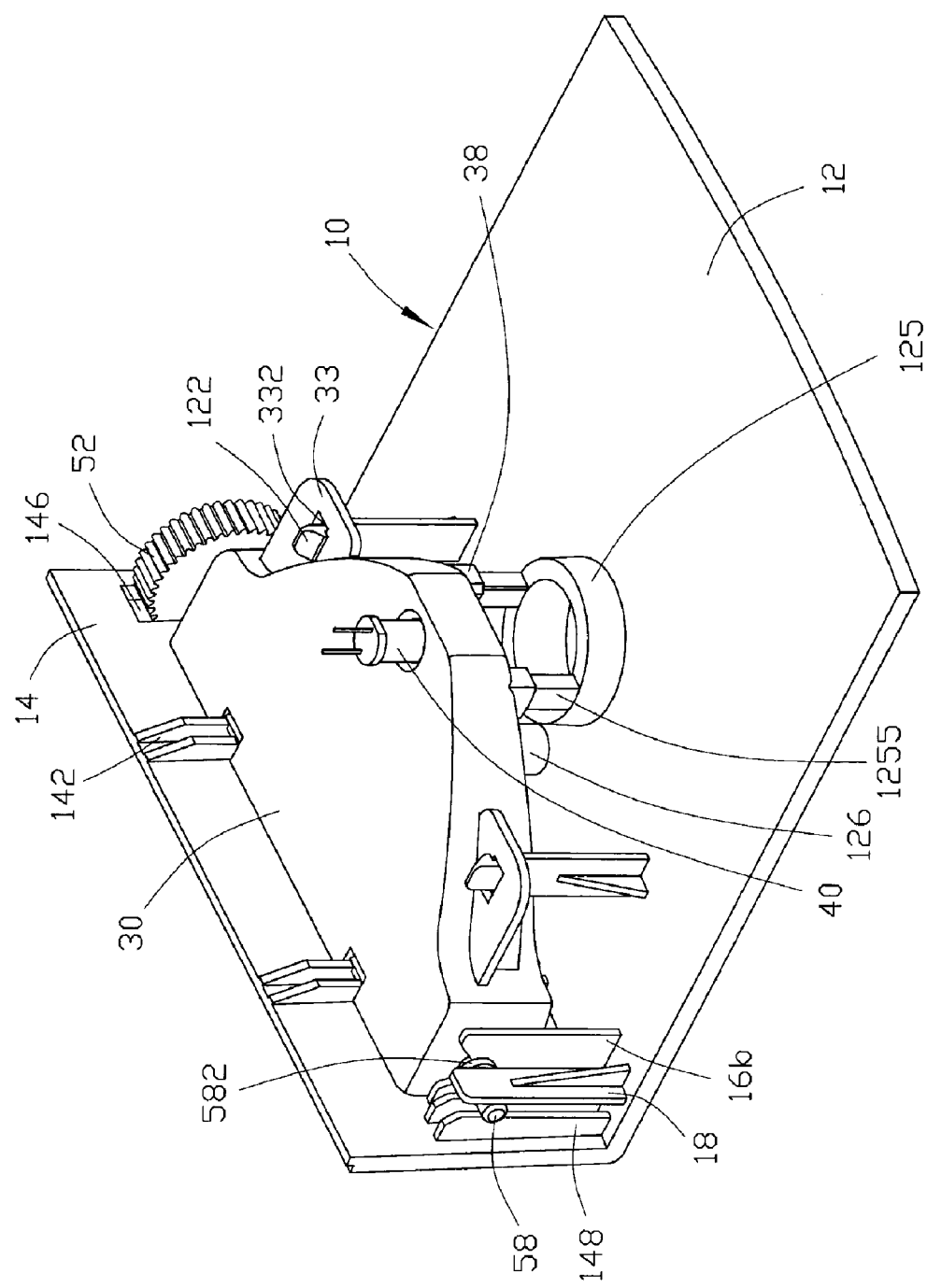
FIG. 4 is an assembled, isometric view of the light guiding apparatus of FIG. 1.

Referring also to FIG. 3 and FIG. 4, when assembling the light guiding apparatus, the shielding member 50 is first placed on the bezel 10 with two ends of the axle 54 received in the notches 162 of the supporting posts 16a and 16b of the bezel 10. The knob 52 protrudes from the through slot 146 of the bezel 10. The blocking tab 542 abuts against the slanting portion 164 of the supporting post 16a. The slanting portion 164 prevents the shielding member 50 from turning beyond a vertical closed position. The flange 582 is placed between the supporting post 16b and the locating beams 148. The blocking tab 584 is placed between the locating beams 148 and the resilient tongue 18 of the bezel 10, and abuts against the resilient tongue 18 (Referring to FIG. 3). The resilient tongue 18 together with the slanting portion 164 restricts the shielding member 50 in the closed position. Therefore, the shielding member 50 is secured to the bezel 10 with the shielding board 56 parallel to the bottom panel 12 of the bezel 10. Then the guiding member 30 is assembled to the bezel 10 with the pivoting slots 36 receiving the axle 54 of the shielding member 50 between the supporting posts 16a and 16b. The guiding portions 142 secure the guiding member 30 in place in the cutout 39 of the guiding member 30. The post 34 is received in the sheath 126 of the bezel 10. The resilient barbs 122 respectively engage with the corresponding securing openings 332 of the guiding member 30. The tabs 1255 of the bezel 10 are received in the corresponding receiving portions 38 of the guiding member 30. The guiding member 30 is secured in the bezel 10. The LED 40 is positioned in the through opening 35 of the guiding member 30.

Figure 5:
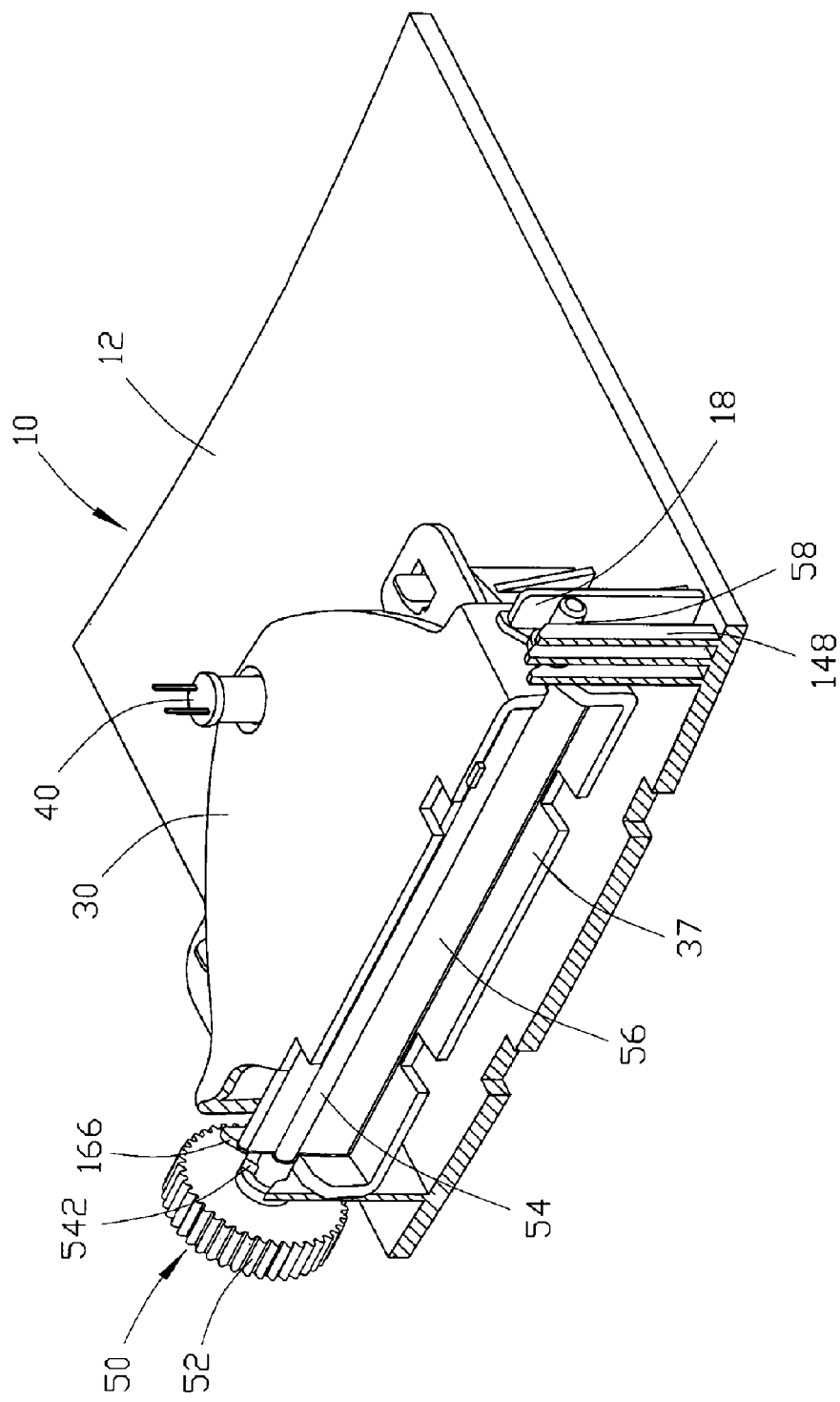
FIG. 5 is similar to FIG. 3, but the guiding member is in a closed position.

Referring also to FIG. 3, when the LED 40 is lit, light emitting from the LED 40 is reflected by the inner surface of the guiding member 30 to the mouth 37 of the guiding member 30 and illuminates the translucent member 144 of the bezel 10. Referring also to FIG. 5, when the shielding member 50 is rotated by a user turning the knob 52. The blocking tab 584 urges the resilient tongue 18 of the bezel 10 to deform, until the blocking tab 584 rotates down to abut against the resilient tongue 18. At this point, the blocking tab 542 is just rotated enough to abut against the slanting portion 166 of the shielding member 50. The shielding board 56 covers the mouth 37 of the guiding member 30, so that the light emitting from LED 40 is hidden. To reveal the light once again the user need only turn the knob 52 in an opposite direction.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guiding apparatus for a computer bezel, comprising:
    a panel having a light-pervious member therein;
    a guiding member attached to the panel for guiding light therein, the guiding member having a light-reflecting cavity with an opening communicating with the light-pervious member; and
    a shielding member situated between the panel and the light-reflecting cavity, the shielding member comprising a shielding board disposed within the light-reflecting cavity of the guiding member for covering the opening thereof, and an axle traversing the shielding board, the shielding member pivotable with respect to the guiding member between a closed position where the shielding board is vertically oriented to close the opening for preventing the light exiting therefrom and an open position where the shielding board is horizontally oriented to open the opening for allowing the light to exit therefrom, wherein a pair of supporting posts is formed on the bottom panel, and each supporting post has a cutout for receiving the axle of the shielding member, the cutout of the supporting post is V-shaped, and the cutout comprises a notch and a pair of slanting portions.

2. The light guiding apparatus as described in claim 1, wherein a bottom panel is formed perpendicular to the panel for receiving the guiding member.

3. The light guiding apparatus as described in claim 1, wherein two blocking tabs are respectively formed at opposite ends of the axle, and one of the blocking tabs pivots between the slanting portions.

4. The light guiding apparatus as described in claim 3, wherein a resilient tongue is formed on the panel for blocking the other one of the blocking tabs.

5. The light guiding apparatus as described in claim 1, wherein a through opening is defined in a top surface of the guiding member for receiving a light source.

6. The light guiding apparatus as described in claim 2, wherein the guiding member has a post thereon, and the bottom panel has a sheath for receiving the post.

7. The light guiding apparatus as described in claim 1, wherein the guiding member has two pivoting slots at opposite sides for holding the axle of the shielding member.

8. The light guiding apparatus as described in claim 1, wherein the guiding member is made in a semi-discoid shape.

9. A light guiding apparatus, comprising:
    a guiding member having a light-reflecting cavity with an opening communicating with an outside;
    a light source positioned in the guiding member;
    a shielding member comprising a shielding board for covering the opening of the guiding member and an axle traversing the shielding board, a first blocking tab and a second blocking tab formed on the axle;
    a pair of supporting posts, comprising a first supporting post defining a cutout for receiving the axle of the shielding member, the first blocking tab received in the cutout and restricted therein; and
    a resilient tongue for blocking the second blocking tab from rotating clockwise when the first blocking tab abutting against the first supporting post in an anticlockwise direction, and blocking the second blocking tab from rotating anticlockwise when the first blocking tab abutting against the supporting post in a clockwise direction.

10. The light guiding apparatus as described in claim 9 further comprising a bottom panel for setting the supporting posts and the resilient tongue.

11. The light guiding apparatus as described in claim 10, wherein the guiding member has a post thereon, and the bottom panel has a sheath for receiving the post.

12. The light guiding apparatus as described in claim 10, wherein a side panel is perpendicularly formed on the bottom panel, and a light-pervious member is defined therein corresponding to the opening of the guiding member.

13. The light guiding apparatus as described in claim 9, wherein the cutout of the supporting post is V-shaped, and the cutout comprises a notch and a pair of slanting portions.

14. The light guiding apparatus as described in claim 9, wherein a through opening is defined in a top surface of the guiding member for receiving the light source.

15. The light guiding apparatus as described in claim 9, wherein the guiding member is made in a semi-discoid shape.

16. A light guiding apparatus for a computer bezel, comprising:
    a panel having a light-pervious member fixed therein and immovable relative to the panel;
    a guiding member attached to the panel and having a light-reflecting cavity with an opening communicating with the light-pervious member;
    a light source positioned in the light-reflecting cavity of the guiding member and spaced from the panel so that the guiding member is able to guide light of the light source toward the light-pervious member; and
    a shielding member situated between the panel and the light-reflecting cavity, the shielding member comprising a shielding board disposed within the light-reflecting cavity of the guiding member for covering the opening thereof, and an axle traversing the shielding board and spaced from two opposite end sides of the shielding board, the shielding member pivotable with respect to the guiding member between a closed position where the shielding board is oriented to close the opening for preventing the light exiting therefrom and an open position where the shielding board is oriented to reveal the opening for allowing the light to exit therefrom.

17. The light guiding apparatus as described in claim 16, wherein a first blocking tab is formed on the axle, and at least one supporting post forms for receiving the axle of the shielding member therein and restricting movement of the first blocking tab.

18. The light guiding apparatus as described in claim 17, wherein a second blocking tab is formed on the axle spaced away from the first blocking tab, and a resilient tongue forms for blocking the second blocking tab based on movement of the first blocking tab.

* * * * *